United States Patent [19]

Sadley et al.

[11] Patent Number: 5,437,255

[45] Date of Patent: Aug. 1, 1995

[54] FUEL INJECTION SYTEM EMPLOYING SOLID-STATE INJECTORS FOR LIQUID FUELED COMBUSTION ENGINES

[76] Inventors: Mark L. Sadley, 336 Larchbrook Dr., Garland, Tex. 75043; David A. Dean, 7733 E RL Thornton #233, Dallas, Tex. 75228

[21] Appl. No.: 212,989

[22] Filed: Mar. 15, 1994

[51] Int. Cl.[6] .......................... F02M 37/04; F02B 3/00
[52] U.S. Cl. ..................................... 123/472; 123/497; 123/498; 123/299; 239/564; 239/584
[58] Field of Search ............... 123/470, 471, 472, 497, 123/498, 499, 299, 300; 417/207; 347/40, 56, 68; 239/102.2, 136, 564, 584; 431/179, 180

[56] References Cited

U.S. PATENT DOCUMENTS

| | | | |
|---|---|---|---|
| 4,216,745 | 8/1980 | Latter et al. | 123/299 |
| 4,698,644 | 10/1987 | Drago et al. | 347/40 |
| 4,811,708 | 3/1989 | Gruden | 123/299 |
| 4,958,774 | 9/1990 | Taylor | 239/584 |
| 5,152,456 | 10/1992 | Ross et al. | 239/102.2 |
| 5,189,437 | 2/1993 | Michaelis et al. | 347/68 |

Primary Examiner—Henry C. Yuen
Assistant Examiner—Erick Solis
Attorney, Agent, or Firm—Konneker & Bush

[57] ABSTRACT

A surface array of electrically actuated pulsed microscopic fuel jets arranged on the interior surface of a mixing chamber injects fuel into air to form a combustible air-fuel mixture. The jets are solid state units with no moving parts, which can be actuated individually or in groups, and the volume of fuel injected per each jet's firing pulse can be varied by changing the characteristics of the electrical actuating pulse. Having no moving parts and being electrically activated, the jets are intrinsically suited to direct computer control. By providing a large number of such jets and a means of their direct electronic control via negative feedback, fine control of the operating parameters of the combustion engine and a high degree of redundancy to compensate for the failure of individual jets is made possible. The lack of moving parts and the absence of a high pressure fuel supply system provide significant advantages in performance, cost, reliability, and safety over the prior art in fuel injection.

6 Claims, 2 Drawing Sheets

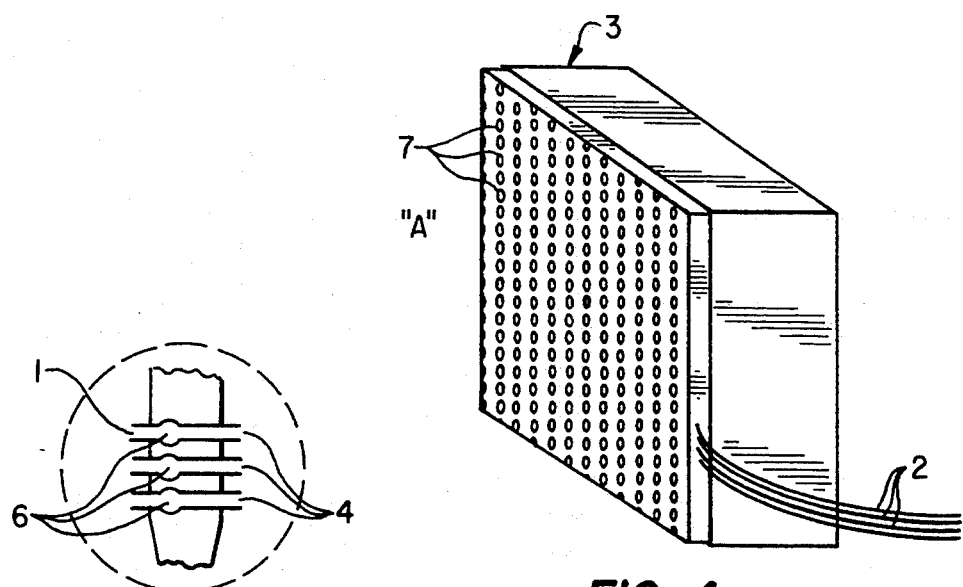
FIG. 4
FIG. 4A
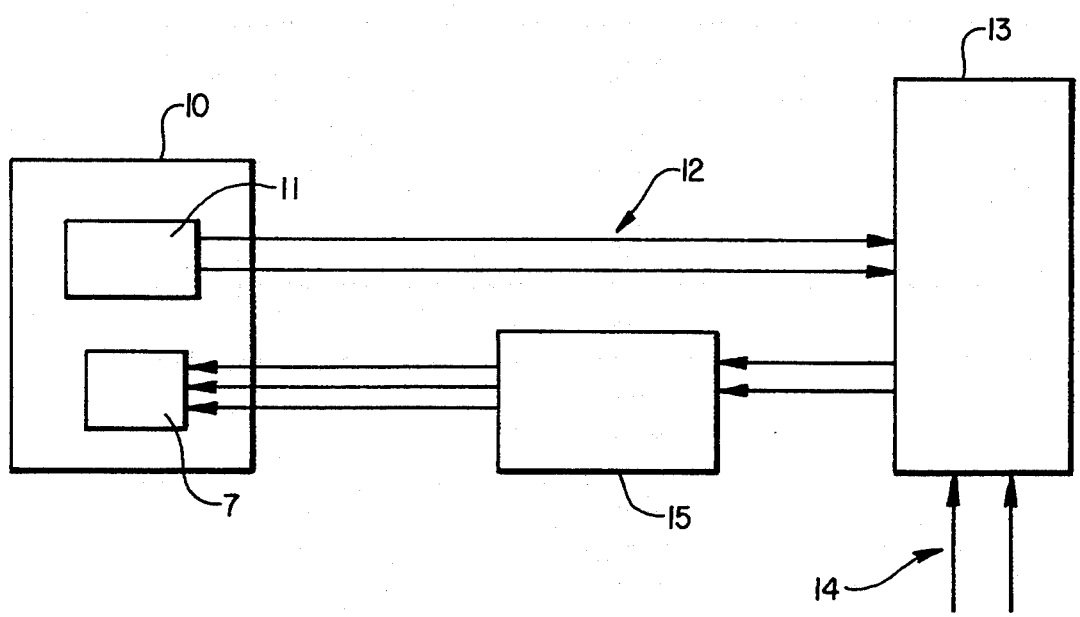
FIG. 5

FUEL INJECTION SYTEM EMPLOYING SOLID-STATE INJECTORS FOR LIQUID FUELED COMBUSTION ENGINES

BACKGROUND OF THE INVENTION

1. Field of the Invention

This invention relates in general to liquid fueled combustion engines and in particular to a new means of preparing the fuel-air mixture for such systems. The invention is representatively applicable to, but not limited to, use with conventional liquid-fueled internal combustion engines.

2. Prior Art

Internal and external combustion engines (e.g. gasoline, diesel and Stirling engines) and other combustion devices, (e.g. heaters, boilers, turbines, etc.) provide a large percentage of the power requirements in the modern world; some common examples include the automobile engine, building heating systems, oil fired steam generators, etc. (Note: for brevity, such combustion systems will be referred to generally as "engines" for the rest of this document.) The vast majority of such devices are powered by liquid fuels. Of great importance in the design of such engines is the means used for mixing the liquid fuel with air (or other oxidizing gaseous mixture-hereafter "air" will be understood to include such gaseous mixtures) prior to burning this mixture in the combustion chamber of the engine.

In order to provide background information so that the invention may be completely understood and appreciated in its proper context, a brief description of the prior art in the field of fuel/air mixing in liquid fueled engines is here provided.

In the past, two primary methods of performing the fuel-air mixing process have dominated: carburation and fuel injection. Carburation has the advantages of simplicity, relatively low cost of manufacture, and low maintenance. Recently, performance, economic, and environmental concerns have brought fuel injection to the forefront of liquid fueled engine technology because fuel injection, with its greater control over the parameters of fuel/air mixing and delivery, provides the designer of combustion engines with greater options in optimizing fuel efficiency, engine control, power output, etc., while at the same time reducing polluting by-products from combustion.

Fuel injection systems create a fuel-air mixture by forcing liquid fuel through an orifice or nozzle into a mixing chamber where air is present. The mixing chamber may be: (1) an intake manifold (this is called "manifold injection"); (2) a cavity immediately outside the combustion chamber which is connected to the combustion chamber through a valved or unvalved passage ("port injection"); or (3) it may be the combustion chamber itself ("direct injection"—e.g. the diesel engine). In the case of multiple combustion chamber internal combustion engines, manifold injection typically employs one fuel injection device to service all cylinders. In the case of port and direct injection, of necessity there is one (or more) injection device(s) per cylinder.

With regard to timing, the injection of fuel may be continuous (called "continuous injection") or modulated in time ("called pulsed injection"). Pulsed injection, while more complicated and costly than continuous injection, allows for greater control of the parameters of mixing and delivering the fuel-air mixture, potentially enabling better optimization of combustion and overall operation of the engine or combustion system.

In summary then, regardless of particular design, all fuel injection systems (both prior art and the invention here described) are either of the "manifold", "port" or "direct" type (or some combination thereof). These types in addition are characterized as being either "continuous" or "pulsed".

Conventional fuel injection systems (i.e. the prior art) generally operate in one of two ways: (1) A high pressure fuel pump provides a flow of fuel under high pressure which is delivered to an orifice or nozzle. A valve (continuous or pulsed) controls the rate at which fuel is sprayed out of the orifice or nozzle into the mixing chamber. (2) A low pressure supply of fuel is directed to a positive displacement pump capable of producing high pressure. The pump provides a high pressure flow of fuel which is sprayed through an orifice, with a precisely controlled amount of fuel being expelled for each pumping cycle. The overall rate at which fuel is injected into the mixing chamber is controlled by altering the cycling rate of the pump and/or the displacement of the pump. Notice that in both designs, a high pressure, highly reliable pump is essential—and such a pump generally requires high precision, costly manufacture. In configuration (1), the production of fuel pressure and the metering of the injection rate are separate functions, performed by the pump and the valving respectively; in configuration (2) these functions are combined. Notice also that in order to achieve timed fuel injection, in configuration (1) a rapidly responding valve system must be provided; to achieve timed fuel injection in configuration (2) the pump must be capable of having both its displacement and its cyclic rate of operation rapidly varied. These requirements result in increased system complexity, with its attendant costs.

Regardless of the precise merits, features, and advantages of the prior art, none of them achieves or fulfills the purposes of the present invention, as the description given below will make apparent. Among the disadvantages of conventional fuel injection are the following: (1) A high degree of mechanical complexity, with the accompanying increase in possible modes of failure; (2) High cost of manufacture and maintenance due to the complexity of the systems; (3) Safety hazards due to the use of high pressure fuel pumps in most conventional fuel injection systems. In automotive applications, for example, the rupture of a high pressure fuel line due to a collision or other failure presents a serious fire hazard—and expensive safety systems must be employed to guard against this danger. (4) Conventional fuel injection systems are "analog" in nature, requiring some kind of digital-to-analog interface in order to allow computer control. These problems of conventional fuel injection have tended to prevent its universal adoption despite its many advantages.

SUMMARY OF THE INVENTION

The objects of the invention are as follows:

The principal object of the present invention is to provide liquid fuel-air mixing means with the capability of continuous or timed operation by means of a vastly simpler design and operating principle than the prior art.

It is also the object of the present invention to provide a means of fuel injection that is inherently suited to direct electronic and/or computer control without the need of expensive electromechanical controls or digital-to-analog interfaces.

It is additionally the object of the present invention to obviate the use of high pressure fuel pumps, eliminating their high cost and complexity and the attendant safety hazards associated with them.

It is further the object of the present invention to provide a fuel injection system with greater reliability through the provision of built-in redundancy in the process of fuel injection, so that the failure of one component of the system will not necessarily entail catastrophic failure of the system as a whole.

It is additionally the object of the present invention to provide a fuel injection mechanism which is of simple, inexpensive construction and simple to service.

It is also the object of the present invention to allow the operation of the fuel injection system on a variety of fuels (or even multiple simultaneous fuels or additives, e.g. the use of water injection) by allowing rapid electronic tailoring of the operating parameters as needed.

The foregoing objects are accomplished by the invention, which, in a preferred embodiment thereof, provides a fuel injection system that is inherently digital in nature and suited to direct electronic control. This is achieved by using a surface array of a large number of electrically activated, solid-state fuel injecting jets similar in concept to those employed in inkjet printers, and by controlling the firing of individual jets to achieve the desired rate and spatial pattern of fuel injection. The use of a large number of small fuel injecting jets allows for rapid, precise electronic control of fuel injection and provides increased operational reliability through redundancy and the elimination of moving parts.

BRIEF DESCRIPTION OF THE DRAWINGS

FIG. 4 is an enlarged scale perspective view of the fuel injection structure;

FIG. 4A is an enlarged scale cross-sectional detail view of the area "A" in FIG. 4; and FIG. 5 is a schematic control diagram of a liquid fueled combustion engine having incorporated therein a fuel injection system embodying principles of the present invention.

DETAILED DESCRIPTION

Figure 1:
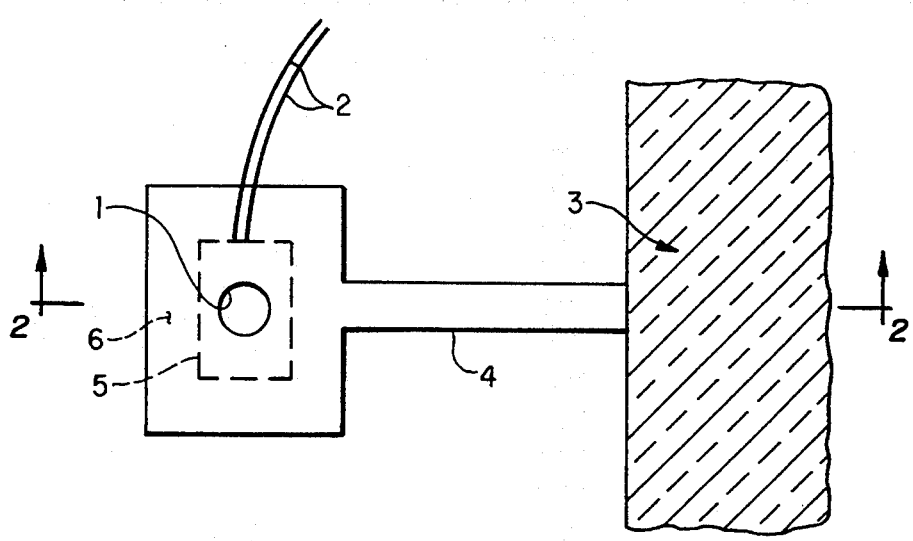
FIG. 1 is a downwardly directed schematic cross-sectional view through a jet portion of a fuel injection structure embodying principles of the present invention.
Figure 2:
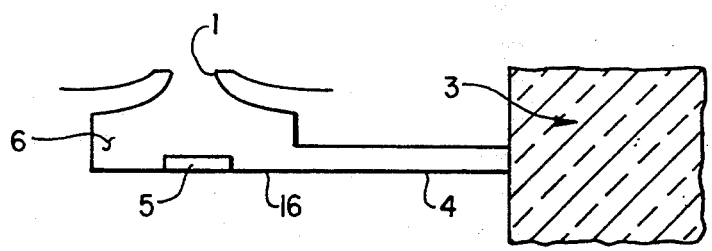
FIG. 2 is a schematic cross-sectional view through the jet portion taken along line 2—2 of FIG. 1.
Figure 3:
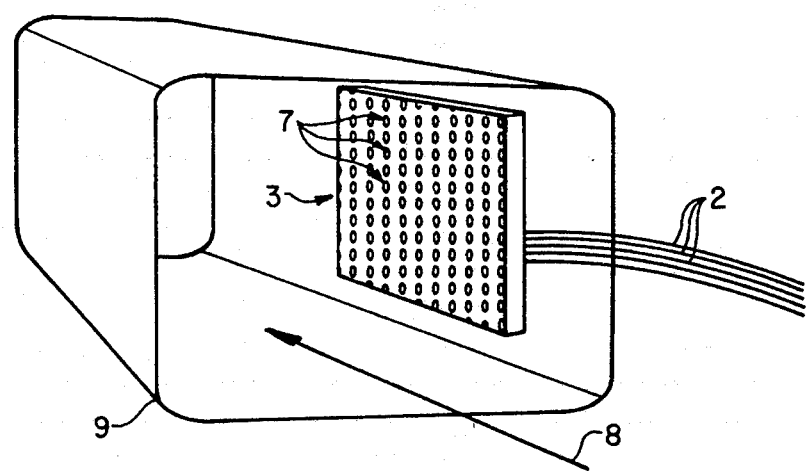
FIG. 3 is a schematic perspective view of the fuel injection structure representatively incorporated in an air/fuel mixing chamber structure useable in conjunction with a liquid fueled combustion engine.

The aforementioned objects are achieved through the new invention, (hereafter called "the injection system") which is here described with reference to the accompanying drawing FIGS. 1-5. Here a single injection assembly is described; one or more such assemblies could be installed in a central location on an engine with a central manifold injection system, or multiple separate units could be used for port or direct injection. It is the nature of the invention to allow scaling to almost any size, by increasing the number of jets and/or using multiple banks of injection assemblies. Here follows a detailed description of a preferred embodiment of the invention.

The injection system employs a surface array of electronically pulsed solid-state "jets" 7 similar to those used in the printhead of an inkjet printer (actuated by thermal, piezoelectric, or other means) to spray fuel into the air 8 in a mixing chamber 9 (manifold, port, or combustion chamber). The array of jets 7 is arranged to cover part or all of the interior surface of the mixing chamber 9, the number of jets 7 being determined by the rate of fuel-air mixture production required. Each jet (or alternatively small group of jets, depending on the application) is individually controlled electronically by a jet firing control unit 15. Because the jets are controllable individually (or in small groups), different spatial as well as time patterns of injection may be achieved by electronically modulating which jets fire and when they fire.

Each jet 7 consists of a fuel chamber 6 with a fuel inlet channel 4 (e.g. a capillary tube) leading to a shared fuel reservoir 3 and a small discharge orifice 1 leading into the mixing chamber 9. The orifice 1 is sufficiently large and its exit channel sufficiently short that it offers much less resistance to the rapid flow of fuel than its associated fuel inlet channel 4. Fuel flows from the reservoir 3 through the fuel inlet channel 4 into the fuel chamber 6 of each jet 7 by capillary action. The reservoir 9 may be filled with a sponge-like material to prevent sloshing and to perform final filtering of particulate matter which might otherwise clog the jets 7. In a thermally actuated fuel jet (the illustrated embodiment), a rapid pulse of electric current is passed through a resistor 5 imbedded in the wall 16 of the fuel chamber, superheating the fuel mixture, which causes it to expand and spray out of the orifice into the mixing chamber 9, where it atomizes and mixes with air 8 flowing through the chamber 9. The resistance of the capillary tube 4 to the rapid outflow of the fuel prevents the superheated fuel from being forced back into the reservoir 3. Once the chamber 6 is empty, it refills by capillary action and is then ready for the next cycle. The physical parameters of the jet 7 (e.g. length and diameter of capillary tube, volume of chamber, diameter and length of orifice, resistor characteristics, etc.) are determined by the particular fuel or fuels to be used. Note that if a jet 7 receives no electric current pulse, it pumps no fuel, and thus it is effectively shut off. With a large number of jets, a very fine control of the rate of fuel injection may be achieved simply by changing the number of jets being fired in a given time interval, even if all firing jets use a fixed electric current pulse characteristic. Further control of the rate of injection may be achieved if desired by varying the characteristics of the electric pulse (i.e. the duration and magnitude of the current pulse through the resistor 5), thus changing the volume of fuel injected per jet per pulse.

Each jet 7 can go through thousands of complete injecting cycles per second, and thus very rapid changes, which are effectively instantaneous on the time scale of reciprocating internal combustion engines, can be made in the fuel injection rate and pattern. By programming a master engine control unit 13 to respond to sensor inputs 12 from appropriate sensing apparatus 11 in an engine 10 (such as predetonation sensing, mixture sensing, etc.) and control inputs 14 (e.g. throttle), the system can provide nearly instantaneous control of the fuel-air mixture to optimize engine operation over a wide range of operating conditions. By providing a complete injection system for each cylinder of an internal combustion engine, maximum performance may be obtained from the engine by continuously optimizing the operation of each cylinder individually, rather than operating all cylinders on a single "compromise" setting, as would be the necessary with conventional manifold injection.

It may be noted that the invention in effect uses individual jets as miniature positive displacement pumps, accomplishing both the formation of fuel pressure and the control of the volume of fuel injected per cycle. This is conceptually analogous to the mode of operation of a fuel injection system employing a macroscopic positive displacement pump (e.g. a diesel engine) with the difference that the pump is replaced by the "jet" and there are large numbers of jets per combustion chamber rather than just one. The volume of fuel injected per cycle, namely, per "firing" of each jet, may be held fixed by holding the current pulse through the jet's actuating element 5 constant, or it may be modulated by modulating the pulse. The overall fuel injection rate is then controlled by varying (1) the percentage of jets firing at a given instant; (2) the cyclic rate of firing of those jets; and (3) the amount of fuel injected per jet per firing. Any or all of these variables may be controlled as needed. The volume of injected fuel per cycle of each jet 7 may also be varied if needed by modifying the electric pulse characteristics.

A master electronic control system may be configured to operate in "negative feedback" mode, so that by sensing combustion and power producing conditions (e.g. combustion temperature, chemical composition of combustion by-products, power output, predetonation, etc.) via engine sensors, the firing pattern of the jets may be continuously adjusted to achieve the desired power output as determined by the operator's "throttle" input. Note that if by design more jets are provided than are required for maximum combustion device power output, then if one or several of the jets fail the feedback system automatically compensates by raising the duty cycle of the remaining functional jets or by actuating previously idle jets, providing a high degree of redundancy and tolerance of partial failure with little or no loss of performance. By monitoring the feedback control outputs, a measure of the number of malfunctioning jets may be determined, so that the operator may predict when jet modules will have to be replaced, without waiting for complete system failure.

The jet/fuel reservoir assembly 7,3 is suitable for manufacture as a unit using methods similar to those used for manufacturing inkjet cartridges. Such modular units would contain all of the mechanical parts of the injection system and could be installed or replaced in a single step. A complete fuel system for a combustion engine using the invention would consist of a main fuel tank, a low pressure pump and piping to deliver fuel to the reservoirs of each modular fuel jet injection module, a jet control unit with associated wiring for each fuel jet injection module, and control electronics (comprising, for example, sensors 11 and a master engine control feedback unit 13 as pictured in FIG. 5). The extremely low parts count, total lack of moving parts except for the low pressure pump, and simplicity of installation of such a system in comparison with the prior art are apparent.

The description given above assumes the use of a jet operating on the thermal actuating principle. Alternatively, a piezoelectrically energized jet (or other type of electrically actuated jet) may be used, with similar results. A piezoelectric fuel jet operates in a fashion similar to the illustrated thermal fuel jet 7, except that the current pulse physically deforms a piezoelectric crystal structure (such as the chamber wall 16), which reduces the volume or changes the shape of the fuel chamber 6, in effect squeezing the liquid fuel out of the orifice 1.

We claim:

1. Fuel injection apparatus for liquid fueled combustion engines, comprising:
  a mixing chamber structure having a passage through which a flow of air may be delivered to a liquid fueled combustion engine;
  a plurality of electrically actuated solid-state fuel-spraying jets, each comprising:
    (1) a fuel chamber;
    (2) a fuel inlet passage communicating with said fuel chamber for flowing fuel from a source thereof into said fuel chamber;
    (3) an exit orifice communicating with said fuel chamber;
    (4) an electrically actuated expelling means for causing fuel introduced into said fuel chamber through said fuel inlet passage to be forcibly expelled out of said exit orifice; and
    (5) means for preventing a reverse flow of fuel from said fuel chamber outwardly through said fuel inlet passage;
  means for supplying fuel to said fuel inlet passages of said fuel-spraying jets;
  means for providing repetitive electrical actuating pulses of predetermined magnitudes, repetition rates, and durations to said electrically actuated expelling means of said fuel-spraying jets so as to produce a repetitive operating cycle in each of said fuel-spraying jet comprising:
    (1) a time interval sufficient for fuel from said fuel supplying means to flow through said fuel inlet passage and fill said fuel chamber of said fuel-spraying jet; followed by
    (2) expulsion of fuel through said exit orifice upon application of said electrical actuating pulse to said electrically actuated expelling means and;
  means for supporting said fuel-spraying jets on said mixing chamber structure so that fuel sprayed from said exit orifices of said fuel-spraying jets into said mixing chamber structure passage can operatively mix with a flow of air being delivered therethrough to a liquid fueled combustion engine.

2. The fuel-injection apparatus of claim 1 wherein, for each of said fuel-spraying jets, said reverse-flow preventing means is formed by said fuel inlet passage having, compared to said exit orifice, a sufficiently small cross-sectional area so as to cause filling of said fuel chamber by capillary action through said fuel inlet passage and having sufficient length so as to provide significantly greater resistance to the rapid outward flow of fuel from said chamber than through said exit orifice, thereby effectively eliminating backflow of fuel from said fuel chamber through said fuel inlet passage upon application of said electrical pulse to said electrically actuated expelling means.

3. The fuel-injection apparatus of claim 1 wherein said electrically actuated expelling means is an electrically resistive element associated with said fuel chamber to heat and cause the expansion of fuel in said fuel chamber upon application of said electrical pulse in a manner thereby causing expulsion of fuel from said chamber through said exit orifice.

4. The fuel injection apparatus of claim 1 wherein said electrically actuated expelling means include a piezoelectric wall portion of said fuel chamber deflectable to reduce the volume of said fuel chamber, upon application of said electrical actuating pulse, so as to cause expulsion of said fuel from said chamber through said exit orifice.

5. A negative-feedback stabilized liquid-fueled combustion engine system comprising:

a liquid-fueled combustion engine equipped with fuel injection apparatus including:

a mixing chamber structure having a passage through which a flow of air may be delivered to a liquid fueled combustion engine;

a plurality of electrically actuated solid-state fuel-spraying jets, each comprising:

(1) a fuel chamber;

(2) a fuel inlet passage communicating with said fuel chamber for flowing fuel from a source thereof into said fuel chamber;

(3) an exit orifice communicating with said fuel chamber;

(4) an electrically actuated expelling means for causing fuel introduced into said fuel chamber through said fuel inlet passage to be forcibly expelled out of said exit orifice; and (5) means for preventing a reverse flow of fuel from said fuel chamber outwardly through said fuel inlet passage;

monitoring means associated with said combustion engine and operative to generate output signals indicative of the values of predetermined operating parameters of said combustion engine; and negative feedback control means for receiving said output signals and input signals indicative of desired values for said predetermined operating parameters, for responsively generating control signals, and for utilizing said control signals to adjust the operation of said fuel-spraying jets in response to deviations in the values of said output signals from the corresponding desired values for said predetermined operating parameters.

6. The combustion engine system of claim 5 wherein said negative feedback control means include:

a master engine control feedback unit adapted to receive said output signals and input signals and responsively generate said control signals, and a jet firing control unit adapted to receive said control signals and responsively transmit firing signals to said fuel-spraying jets.

* * * * *